US008688946B2

(12) United States Patent
Foster et al.

(10) Patent No.: US 8,688,946 B2
(45) Date of Patent: *Apr. 1, 2014

(54) SELECTING AN AUXILIARY STORAGE MEDIUM FOR WRITING DATA OF REAL STORAGE PAGES

(75) Inventors: Alfred F. Foster, Wappingers Falls, NY (US); Duane C. Hughes, Cape Vincent, NY (US); Charles E. Mari, Wappingers Falls, NY (US); Robert Miller, Jr., Poughkeepsie, NY (US); Harris M. Morgenstern, Wappingers Falls, NY (US); Walter W. Otto, Clinton Corners, NY (US); Steven M. Partlow, Beacon, NY (US); Thomas F. Rankin, Wallkill, NY (US); Peter G. Sutton, Lagrangeville, NY (US); Elpida Tzortzatos, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/459,144

(22) Filed: Apr. 28, 2012

(65) Prior Publication Data

US 2012/0284458 A1 Nov. 8, 2012

Related U.S. Application Data

(63) Continuation of application No. 13/101,725, filed on May 5, 2011.

(51) Int. Cl.
*G06F 12/00* (2006.01)

(52) U.S. Cl.
USPC .................................... 711/170; 711/154

(58) Field of Classification Search
USPC .............. 711/112, 154, 170–173, E12.001, 711/E12.002, E12.005, E12.013; 345/543
See application file for complete search history.

(56) References Cited

U.S. PATENT DOCUMENTS

| 4,638,424 | A | * | 1/1987 | Beglin et al. | ................ | 711/117 |
| 4,771,375 | A | * | 9/1988 | Beglin et al. | ................ | 711/111 |
| 5,394,539 | A | * | 2/1995 | Neuhard et al. | ............ | 711/209 |
| 5,675,790 | A |   | 10/1997 | Walls |  |  |
| 5,784,698 | A |   | 7/1998 | Brady et al. |  |  |

(Continued)

FOREIGN PATENT DOCUMENTS

CN   101093455 A   12/2007

OTHER PUBLICATIONS

Wang, Feng, "Storage Management in Large Distributed Object-Based Storage Systems", University of California, Dec. 2006.

(Continued)

*Primary Examiner* — Matthew Bradley
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

An auxiliary storage medium is selected for writing data of a set of one or more pages being paged-out from real memory. The auxiliary storage medium is selected from among a plurality of auxiliary storage media, including differing types of storage media, based on characteristics of the plurality of storage media and/or the attributes of the data being written to the auxiliary storage media.

11 Claims, 4 Drawing Sheets

(56) References Cited

U.S. PATENT DOCUMENTS

| | | | |
|---|---|---|---|
| 5,784,699 | A | 7/1998 | McMahon et al. |
| 5,784,707 | A | 7/1998 | Khalidi et al. |
| 5,813,045 | A | 9/1998 | Mahalingaiah et al. |
| 6,061,763 | A | 5/2000 | Rubin et al. |
| 6,112,301 | A | 8/2000 | Johnson |
| 6,182,089 | B1 | 1/2001 | Ganapathy et al. |
| 6,202,134 | B1 | 3/2001 | Shirai |
| 6,223,335 | B1 | 4/2001 | Cartwright, Jr. et al. |
| 6,598,143 | B1 | 7/2003 | Baker et al. |
| 6,701,420 | B1 | 3/2004 | Hamilton et al. |
| 6,718,445 | B1 | 4/2004 | Lewis et al. |
| 6,738,866 | B2 | 5/2004 | Ting |
| 6,782,466 | B1 | 8/2004 | Steele et al. |
| 6,889,307 | B1 | 5/2005 | Scheuerlein |
| 6,961,835 | B2 | 11/2005 | Lightstone et al. |
| 7,003,647 | B2 | 2/2006 | Jacobs et al. |
| 7,080,081 | B2 | 7/2006 | Agarwal et al. |
| 7,225,313 | B2 | 5/2007 | Mather et al. |
| 7,236,974 | B2 | 6/2007 | Bhattacharjee et al. |
| 7,437,529 | B2 | 10/2008 | Burugula et al. |
| 7,484,072 | B2 | 1/2009 | Hepkin et al. |
| 7,543,123 | B2 | 6/2009 | Evanchik et al. |
| 7,765,211 | B2 | 7/2010 | Bhattacharjee et al. |
| 7,802,070 | B2 | 9/2010 | Cholleti et al. |
| 8,312,242 | B2 | 11/2012 | Casper et al. |
| 8,417,912 | B2 | 4/2013 | Olszewski |
| 2003/0084266 | A1 | 5/2003 | Knippel et al. |
| 2004/0128466 | A1 | 7/2004 | Kadohiro |
| 2005/0005080 | A1 | 1/2005 | Dunshea et al. |
| 2006/0004977 | A1 | 1/2006 | Jann et al. |
| 2007/0156997 | A1 | 7/2007 | Boule et al. |
| 2008/0104358 | A1 | 5/2008 | Noel et al. |
| 2009/0055609 | A1 | 2/2009 | Kuczynski et al. |
| 2010/0070733 | A1 | 3/2010 | Ng et al. |
| 2010/0106930 | A1 | 4/2010 | Foltz et al. |
| 2010/0161929 | A1 | 6/2010 | Nation et al. |
| 2010/0211756 | A1 | 8/2010 | Kaminski et al. |
| 2011/0087857 | A1 | 4/2011 | Bomma et al. |
| 2012/0054466 | A1 | 3/2012 | Devendran et al. |
| 2012/0246386 | A1 | 9/2012 | Akutsu et al. |
| 2012/0284457 | A1 | 11/2012 | Foster et al. |
| 2012/0284478 | A1 | 11/2012 | Brooker et al. |
| 2012/0284479 | A1 | 11/2012 | Foster et al. |
| 2012/0284483 | A1 | 11/2012 | Foster et al. |

OTHER PUBLICATIONS

Matyas, M. et al., "Reviersible Data Mixing Procedure for Efficient Public-Key Encryption," Oct. 1998.
Scheifler, Robert W., "X Window System Protocol, Version 11, Alpha Update," Jun. 1987.
"z/Architecture—Principles of Operation", IBM Publication No. SA22-7832-08, Aug. 2010.
Murray, Bill, "Mixing Formal and Dynamic Verification, Part 1," SCDsource 2007-2010, pp. 1-31 (no further date information available).
Khalidi, Yousef A., et al., "Virtual Memory Support for Multiple Pages," Sun Microsystems Laboratories, Inc., Sep. 1993, pp. 1-7.
Olszewski, Bret R., et al., "Management of Low-Paging Space Conditions in an Operating System," U.S. Appl. No. 12/875,831, filed Sep. 3, 2010.
Talluri, Madhusudhan, et al., "Tradeoffs in Supporting Two Page Sizes," Jun. 1992, pp. 415-424.
"Intelligent and Automated Allocation/Re-allocation of Paging Space to Enhance the Overall Operating System Performance," IP.com number: IPCOM000153048D, May 2007, pp. 1-4.
Tian, Yi et al., "Efficient Data Placement and Replacement Algorithms for Multiple-Level Memory Hierarchy," Proc. 10th International Conference on Parallel and Distributed Computing Systems, Oct. 1998, pp. 196-201.
Beretvas, Thomas, "Paging Enhancements in VM/SP HPO," pp. 728-737, Dec. 1984.
Knox, Deborah, et al., "Disk Swapping in Paged Distributed Virtual Memory Systems," pp. 153-157, Oct. 1994.
Brooker, Christopher G., et al., "Managing Storage Extents and the Obtaining of Storage Blocks within the Extents," U.S. Appl. No. 13/101,731, filed May 5, 2011.
Foster, Alfred F., et al., "Managing Large Page Memory Pools," U.S. Appl. No. 13/101,735, filed May 5, 2011.
Foster, Alfred F., et al., "Managing Allocation of Memory Pages," U.S. Appl. No. 13/101,791, filed May 5, 2011.
Office Action for U.S. Appl. No. 13/101,725 dated Jun. 5, 2013, pp. 1-46.
Office Action for U.S. Appl. No. 13/101,731 dated Jun. 5, 2013, pp. 1-58.
Siegel, J.J. et al., "Compare Double and Swap Extended Instruction," IPCOM000085697D, Mar. 2005, pp. 1.
Kinkade, J.D., et al., "Compare and Swap Implementation of Task Logic," IPCOM000079473D, Feb. 2005, pp. 1-3.
Office Action for U.S. Appl. No. 13/101,735 dated Jun. 28, 2013, pp. 1-55.
Wiseman, Yair et al., "Advanced Operating Systems and Kernel Applications: Techniques and Technologies," Information Science Reference, published Sep. 2009, pp. 1-320.
Navarro, Juan et al., "Practical, Transparent Operating System Support for Superpages," Rice University, ACM SIGOPS Operating Systems Review—OSDI '02, vol. 36, Issue SI, Winter 2002 (no further date information available), pp. 89-104.
Subramanian, Indira et al., "Implementation of Multiple Pagesize Support in HP-UX," Proceeddings of the USENIX Annual Technical Conference (No. 98), Jun. 1998, pp. 1-15.
Gopinath, K. et al., "Program Analysis for Page Size Selection," Department of Computer Science & Automation, Indian Institute of Science, Bangalore, Aug. 1996, pp. 189-194.
Wienand, Ian, "A Survey of Large-Page Support," University of New South Sales, 2006 (no further date information available), pp. 1-52.
Qu et al., "GISP: A Transparent Superpage Support Framework for Linux," Microprocessor Research and Development Center, Peking University, Apr. 2007, pp. 359-364.
Zhang, Xiaohui et al., "Performance Improvement for Multicore Processors Using Variable Page Technologies," 2011 Sixth IEEE International Conference on Networking, Architecture and Storage, Jul. 2011, pp. 230-235.
"z/Architecture—Principles of Operation," IBM Document No. SA22-7832-08, Aug. 2010, p. 10-108.
Talluri, Madhusudhan and Mark D. Hill, "Surpassing the TLB Performance of Superpages with Less Operating System Support," University of Wisconsin, Mar. 1994, pp. 171-182.
Wienand, Ian, "Transparent Large-Page Support for Itanium Linux," University of South Wales, Jul. 2008, pp. 1-117.
"z/Os Basic Skills Information Center—z/Os Concepts," IBM Corporation, © 2006, 2010 (no further date information available), pp. 1-117.
Romer, Theodore Haynes, "Using Virtual Memory to Improve Cache and TLB Performance," University of Washington, 1998 (no further date information available), pp. 1-157.
Office Action for U.S. Appl. No. 13/101,791 dated Jul. 30, 2013, pp. 1-42.
Weisberg, P. and Y. Wiseman, "Using 4KB Page Size for Virtual Memory is Obsolete," Jul. 2009, pp. 262-265.
Walsh, Kathy, "z/Os 1.9: Large Page Support," IBM Advanced Technical Support, Apr. 2008, pp. 1-12.
Tzortzatos, Elpida, "z/Os Basics: Virtual Storage Management (VSM) Overview," 2009 (no further date information available), pp. 1-68.
"AIX Version 5.3—Performance Management", IBM Reference No. SC23-4905-06, Seventh Edition, Oct. 2009, pp. 1-416.

\* cited by examiner

SELECTING AN AUXILIARY STORAGE MEDIUM FOR WRITING DATA OF REAL STORAGE PAGES

This application is a continuation of U.S. Ser. No. 13/101,725, entitled "SELECTING AN AUXILIARY STORAGE MEDIUM FOR WRITING DATA OF REAL STORAGE PAGES," filed May 5, 2011, which is hereby incorporated herein by reference in its entirety.

BACKGROUND

One or more aspects of the present invention relate, in general, to managing storage of a computing environment, and in particular, to paging real storage pages out from main memory to auxiliary storage of the computing environment.

A computing environment may include main memory, as well as auxiliary storage, such as direct access storage devices (DASD) or flash memory. Main memory includes pages of memory that are backed by real storage, referred to as real storage frames. These pages are ready to be accessed by applications, instructions, operations, or other entities. Main memory is limited in space, and therefore, typically only the most recently used pages of memory are maintained in main memory. The other pages of memory are maintained in auxiliary storage.

Pages of real storage may be periodically paged-out to auxiliary storage. The paging-out depends on real storage usage patterns and the need for real storage by critical or high priority work.

BRIEF SUMMARY

The shortcomings of the prior art are overcome and additional advantages are provided through the provision of a method of selecting an auxiliary storage medium for writing data. The method includes, for instance, obtaining one or more attributes of data to be written on auxiliary storage; obtaining one or more characteristics of a plurality of auxiliary storage media, said plurality of auxiliary storage media comprising multiple types of auxiliary storage; selecting a type of auxiliary storage from the multiple types of auxiliary storage on which the data is to be written, the selecting being based on at least one of the one or more attributes of the data and the one or more characteristics of the plurality of auxiliary storage media; and based on selecting the type of auxiliary storage, choosing an auxiliary storage medium of the selected type of auxiliary storage on which the data is to be written.

Computer program products and systems relating to one or more aspects of the present invention are described and may be claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, a capability is provided for selecting an auxiliary storage medium for writing data of a set of one or more pages being paged-out from main memory. The auxiliary storage medium is selected from among a plurality of auxiliary storage media, including differing types of storage media, based on characteristics of the plurality of storage media (e.g., performance characteristics, availability characteristics, etc) and/or the attributes of the data being written to the auxiliary storage media.

Figure 1:
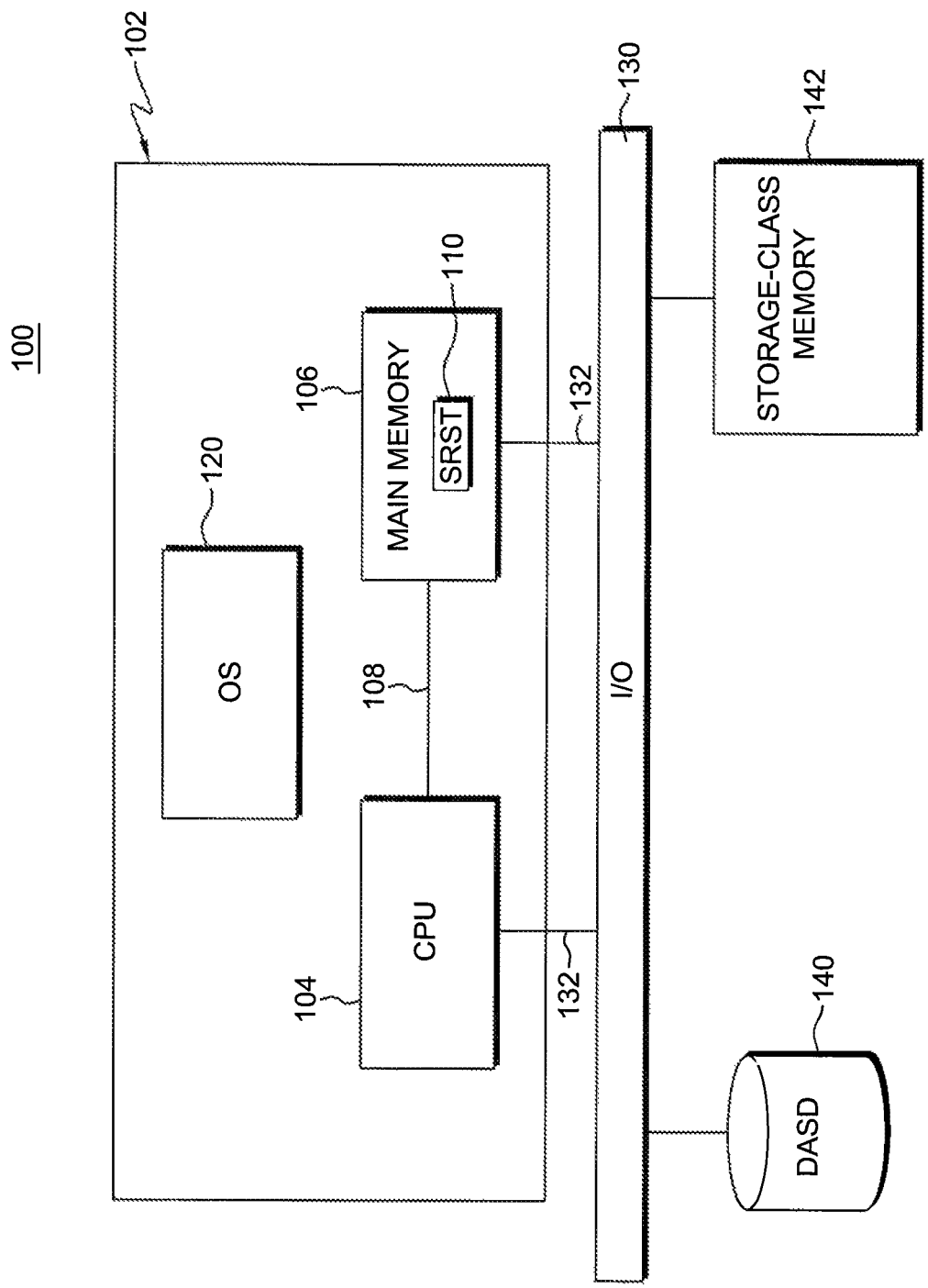
FIG. 1 depicts one example of a computing environment to incorporate and/or use one or more aspects of the present invention.

One embodiment of a computing environment to incorporate and/or use one Or more aspects of the present invention is described with reference to FIG. 1. Computing environment 100 is based, for instance, on the Z/ARCHITECTURE® offered by International Business Machines Corporation, Armonk, N.Y. The Z/ARCHITECTURE® is described in an IBM® publication entitled, "z/Architecture Principles of Operation," IBM Publication No. SA22-7832-08, August 2010, which is hereby incorporated herein by reference in its entirety. In one example, a computing environment based on the Z/ARCHITECTURE® includes the ZENTERPRISE®196 (Z196) system, offered by International Business Machines Corporation, Armonk, N.Y. IBM® and Z/ARCHITECTURE® are registered trademarks, and ZENTERPRISE®196 and Z196 are trademarks of International Business Machines Corporation, Armonk, N.Y., USA. Other names used herein may be registered trademarks, trademarks or product names of International Business Machines Corporation or other companies.

As one example, computing environment 100 includes a system 102, such as one or more servers, a central processing complex, etc., that includes, for instance, one or more central processing units (CPUs) 104 coupled to main memory 106 via one or more buses 108. One of the central processing units 104 may execute an operating system 120, such as the Z/OS® operating system offered by International Business Machines Corporation. In other examples, one or more of the central processing units may execute other operating systems or no operating system. Z/OS® is a registered trademark of International Business Machines Corporation, Armonk, N.Y., USA.

Central processing unit(s) 104 and main memory 106 are further coupled to an I/O subsystem 130 via one or more connections 132 (e.g., buses or other connections). The I/O subsystem provides connectivity to one or more auxiliary storage media, including, for instance, one or more direct access storage devices (DASD) 140 and storage-class memory 142 (e.g., flash memory). In one particular example of the Z/ARCHITECTURE®, the I/O subsystem is a channel subsystem. However, the I/O subsystem may be other than a channel subsystem, and the auxiliary storage media may be other than or in addition to DASD and storage-class memory.

Figure 2:
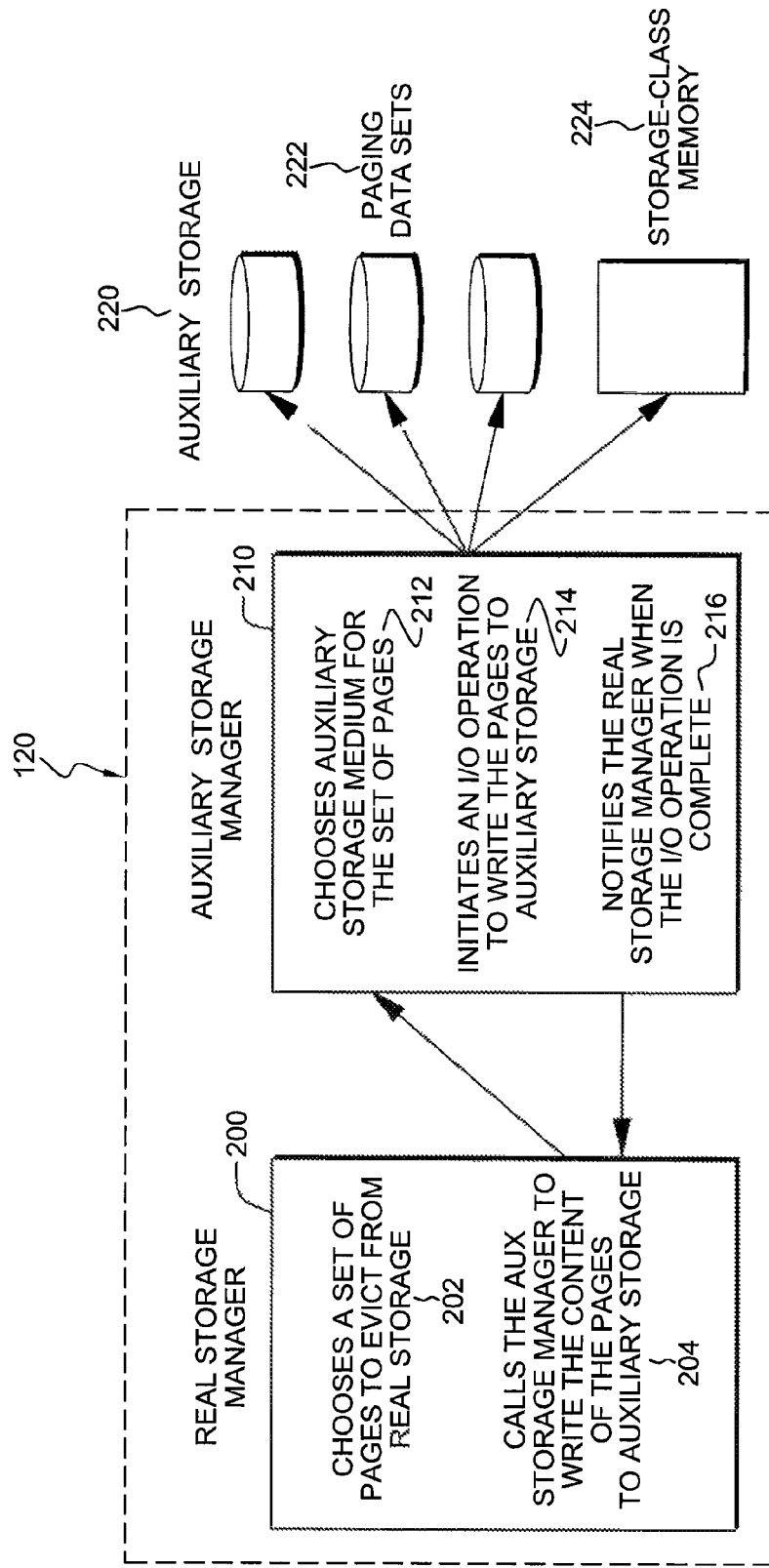
FIG. 2 depicts examples of various storage managers including aspects of their responsibilities, as well as examples of different storage media, in accordance with an aspect of the present invention.

Main memory and auxiliary storage are managed, in one example, by storage managers of operating system 120, as described in further detail with reference to FIG. 2. In one example, a real storage manager (RSM) 200 of operating system 120 is responsible for tracking the contents of main memory and managing the paging activities of main memory, including the paging-in to main memory and the paging-out to auxiliary storage. Further, an auxiliary storage manager (ASM) 210 of operating system 120 is responsible for tracking auxiliary storage and for working with the real storage manager to find media to store real pages that are being paged-out from main memory. Real storage manager 200 and auxiliary storage manager 210 cooperate to page-out real storage pages from main memory to auxiliary storage 220.

Auxiliary storage 220, as used herein, is any memory or storage other than main memory or associated caches. As examples, auxiliary storage includes, for instance, one or more paging data sets 222 (e.g., residing on DASD) and storage-class memory 224 (e.g., flash memory). Each of these different types of auxiliary storage has one or more characteristics associated therewith, including, for instance, type of auxiliary storage, performance characteristics, availability characteristics, etc. The characteristics associated with one type of auxiliary storage medium may differ from other types of auxiliary storage medium. Further, the characteristics of one storage medium of a particular type of storage medium may be the same as or different from the characteristics of another storage medium of that particular type. For instance, one storage medium of one particular type may have more available space than another storage medium of that type, or may be performing better than the other storage medium. Other examples also exist.

The performance characteristics indicate, for example, the rate in which an input/output (I/O) operation is performed. In one example, for each auxiliary storage medium of the computing environment (e.g., each DASD data set, the storage-class memory), a variable, referred to as a single request service time (SRST), is maintained. This value is a measurement of the amount of time required to process a single 4K I/O operation from the time the I/O operation is initiated by the auxiliary storage manager to the point in time when the auxiliary storage manager is notified of completion of the I/O operation. It is maintained as a moving average (a dynamic value), and includes, in this example, a percentage (e.g., ⅔) of the existing value plus a percentage (e.g., ⅓) of the time for the just completed I/O operation. In one example, as depicted in FIG. 1, each SRST is maintained in a control block 110 in main memory and the appropriate SRST is updated after completion of each I/O operation.

The availability characteristics indicate, for instance, if the storage media may be used for recovery. That is, some types of storage media, such as DASD, may be used for recovery, while other types of storage media, such as flash memory, may not be used for recovery. Further, some types of auxiliary storage may be able to have certain data written thereto, while other types cannot, depending on attributes of the data to be written. That is, the type of data being written may impose additional requirements as to the auxiliary storage to which it may be written.

Other characteristics may also be associated with the auxiliary storage media. Performance and availability are only two examples.

Further aspects of real storage manager 200 and auxiliary storage manager 210 are described with reference to FIG. 2. In particular, the interaction between the two managers to page data out to auxiliary storage 220 is described. As one example, real storage manager 200 chooses a set of one or more pages to evict from real storage (202), and calls auxiliary storage manager 210 to have the content (e.g., data) of those pages written to auxiliary storage (204). Responsive to being called to page-out the data, auxiliary storage manager 210 chooses an auxiliary storage medium (or media) for the set of pages (212), initiates an I/O operation to write the pages to the selected auxiliary storage (214), and notifies real storage manager 200 when the I/O operation is complete (216).

To select the auxiliary storage medium in which to write the data, in accordance with an aspect of the present invention, the auxiliary storage manager uses a technique in which selection is based on certain criteria, such as characteristics of the different auxiliary storage media and/or attributes of the data being written to auxiliary storage. In one embodiment, one or more optimum media are selected to enhance system performance.

Figure 3:
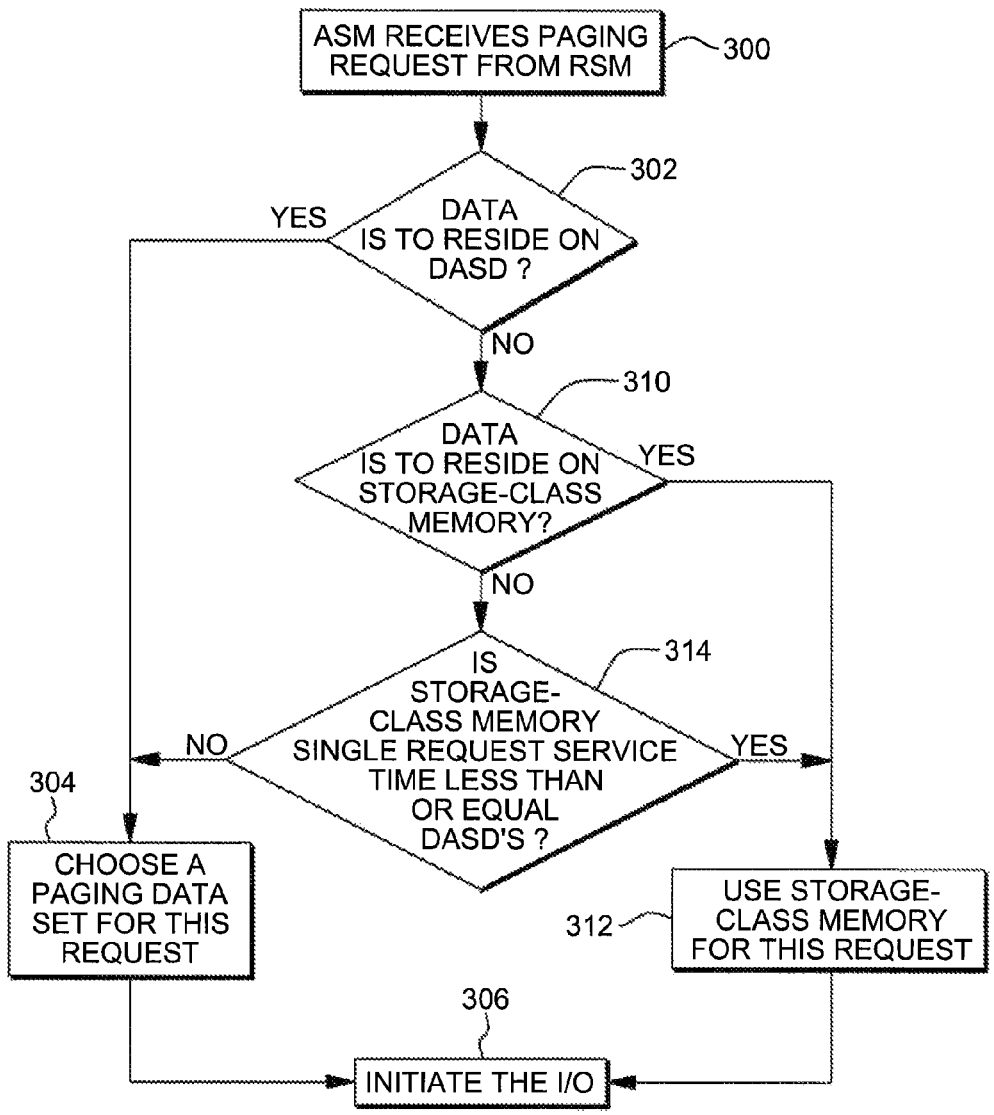
FIG. 3 depicts one embodiment of the logic to select an appropriate auxiliary storage medium on which data of real storage pages may be written, in accordance with an aspect of the present invention.

One embodiment of the logic employed by the auxiliary storage manager to select an auxiliary storage medium to receive data being written from main memory is described with reference to FIG. 3. Initially, auxiliary storage manager 210 receives a paging request from real storage manager 200, STEP 300. Responsive thereto, the auxiliary storage manager considers the attributes of the data being written to determine if the data is to be written to a particular type of auxiliary storage. For instance, the auxiliary storage manager determines whether the data is to reside on DASD, since it is unable to reside on other types of auxiliary storage, INQUIRY 302. As an example, one or more control blocks relating to the data are checked to determine if the data is to reside on DASD. As a particular example, if a control block indicates the data is virtual I/O data, then the data is to reside on DASD because of system restart requirements. Further, data in certain address spaces are to reside on DASD. Indications of what types of data are to be written to DASD or other types of media are accessible to the auxiliary storage manager and used in determining where the data is to reside.

If the data is to reside on DASD, rather than on another type of auxiliary storage, then the auxiliary storage manager selects a paging data set for this request, STEP 304. In one example, the paging data set is selected randomly or by a defined selection mechanism. One such selection mechanism is one that selects the data set based on characteristics of the data set, such as the data set with the most available space or best performance. In one example, performance is represented as a dynamic value (e.g., SRST) maintained as a systems running value and not a static value assigned initially. Other selection mechanisms may also be used.

Subsequent to selecting the appropriate data set for this request, the I/O operation is initiated, STEP 306.

Returning to INQUIRY 302, if the data need not reside on DASD, then the auxiliary storage manager checks whether the data is to reside on storage-class memory, INQUIRY 310. Again, one or more control blocks associated with the data include information used to make this determination. If the data is to reside on storage-class memory, and not on another type of storage, such as DASD, then storage-class memory is selected for this I/O operation, STEP 312. Thereafter, the I/O operation is initiated, STEP 306.

However, if the data need not reside on storage-class memory, INQUIRY 310, and instead, can reside on either DASD or storage-class memory, then chosen characteristics of the auxiliary storage media are used to select which storage medium the data is to be written. In this particular example, performance characteristics of the available auxiliary storage media are taken into consideration. However, in other examples, availability and/or other characteristics may be chosen for consideration.

Since in this example performance is the deciding factor for a set of pages, a determination is made as to whether the single request service time for the storage-class memory is less than or equal to the lowest single request service time for DASD, INQUIRY 314. In this example, each DASD data set has a SRST value associated therewith, but there is only one SRST for the storage-class memory. The lowest value for DASD is maintained and is compared to the value for the storage-class memory. If the single request service time for the storage-class memory is less than or equal to the lowest single request service time for DASD, then storage-class memory is used for the I/O operation, STEP 312. Otherwise, a paging data set with the lowest single request service time is selected for the I/O operation, STEP 304.

Subsequent to selecting the auxiliary storage medium for the request, the I/O operation is initiated, STEP 306. Responsive to initiating the I/O operation, the data of the real storage pages is moved from main memory to the selected auxiliary storage medium (or media). Subsequent to completing the I/O operation, in one example, the single request service time for the auxiliary storage medium to which the data is written is calculated and stored in the control block in main memory.

In the above embodiment, the auxiliary storage medium is selected based on performance, responsive to determinations that any type of auxiliary storage may be used. In other embodiments, however, other criteria may be used including availability or other characteristics. If availability is used, then the determination is based on which auxiliary storage medium offers better resiliency (i.e., able to retrieve data from the storage medium). In this example, INQUIRY 314 is replaced by an inquiry that relates to which auxiliary storage medium has the best resiliency.

In a further embodiment, the logic may be general enough to cover a variety of criteria. In such a situation, an inquiry is provided that asks which criterion is to be considered, and the specific path taken (with the appropriate inquiry, similar to INQUIRY 314) will depend on the selected criterion.

In yet a further embodiment, multiple criteria may be considered (e.g., performance, availability, and/or other criteria). In this instance, the logic includes inquiries that are pertinent to the various characteristics being considered and selection is based on a best-fit criterion, as defined for the auxiliary storage manager. Many other variations are also possible.

Described in detail above is a capability for dynamically selecting an auxiliary storage medium to be used in response to a request to page-out data from main memory. In one example, the selection is based on the type of data and one or more selected characteristics of the available auxiliary storage.

Additional information relating to main memory and auxiliary storage is provided in the following commonly assigned applications co-filed herewith, each of which is hereby incorporated herein by reference in its entirety: U.S. Ser. No. 13/101,731, "MANAGING STORAGE EXTENTS AND THE OBTAINING OF STORAGE BLOCKS WITHIN THE EXTENTS" (POU920110066US1); U.S. Ser. No. 13/101,735, "MANAGING LARGE PAGE MEMORY POOLS" (POU920110067US1); and U.S. Ser. No. 13/101,791, "MANAGING ALLOCATION OF MEMORY PAGES" (POU920110068US1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 4:
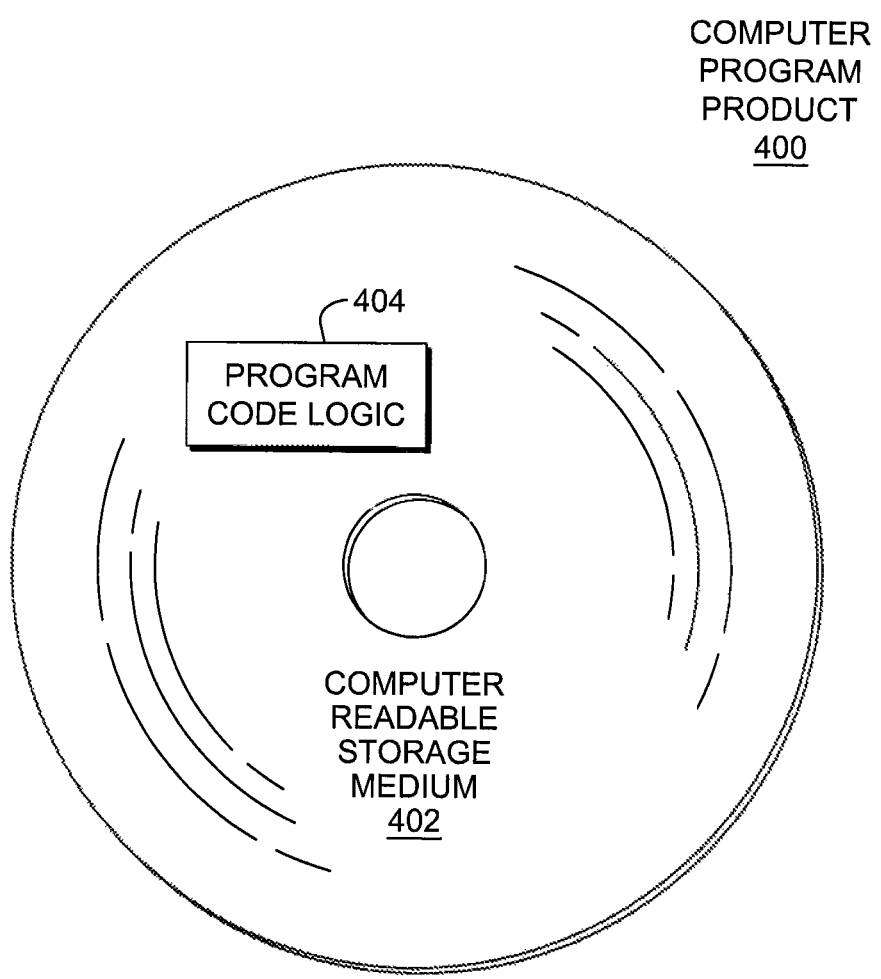
FIG. 4 depicts one embodiment of a computer program product to incorporate one or more aspects of the present invention.

Referring now to FIG. 4, in one example, a computer program product 400 includes, for instance, one or more non-transitory computer readable storage media 402 to store computer readable program code means or logic 404 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, although examples of auxiliary storage are described herein, other types of auxiliary storage may be used without departing from the spirit of the present invention. One or more aspects of the present invention are not limited to main memory and auxiliary storage, but can apply to other memory hierarchies. Additionally, other characteristics and/or criteria may be considered without departing from the spirit of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of selecting auxiliary storage media for writing data thereto, said method comprising:
   obtaining one or more attributes of data, the data to be written on auxiliary storage, and the one or more attributes relating to a type of the data or memory location of the data, and wherein the one or more attributes are to he used to determine whether the data is required, based on the one or more attributes, to be written on a particular type of auxiliary storage;
   obtaining one or more characteristics of a plurality of auxiliary storage media, said plurality of auxiliary storage media comprising multiple different types of auxiliary storage;
   selecting a type of auxiliary storage from the multiple different types of auxiliary storage on which the data is to be written, the selecting being based on the one or more attributes of the data, and wherein the selecting comprises:
      checking the one or more attributes of the data;
      determining, based on the checking the one or more attributes, whether the data is required to reside on a particular type of auxiliary storage; and
      selecting the type of auxiliary storage based on the determining, wherein based on the determining indicating the data is required to reside on a particular type of auxiliary storage, selecting that particular type of auxiliary storage as the type of auxiliary storage on which the data is to be written, and based on the determining indicating the data is not required to reside on a particular type of auxiliary storage, selecting the type auxiliary storage on which the data is to be written based on one or more characteristics of the plurality of auxiliary storage media; and
   based on selecting the type of auxiliary storage, choosing an auxiliary storage medium of the selected type of auxiliary storage on which the data is to be written.

2. The method of claim 1, wherein the one or more characteristics comprise at least one of performance characteristics and availability characteristics.

3. The method of claim 1, wherein the selecting the type of auxiliary storage on which the data is to be written based on the one or more characteristics of the plurality of auxiliary storage media comprises selecting the type of auxiliary storage based on performance characteristics, wherein the selecting based on performance characteristics includes selecting the type of auxiliary storage based on single request service times of the plurality of auxiliary storage media.

4. The method of claim 3, further comprising calculating the single request service time for each of the plurality of auxiliary storage media, and wherein the single request service time for an auxiliary storage medium is a measurement of an amount of time to process a single I/O operation from the time the I/O operation is initiated to completion.

5. The method of claim 4, wherein the single request service time for an auxiliary storage medium is maintained as a moving average, and includes a first percentage of an existing value plus a second percentage of a current measurement.

6. The method of claim 1, wherein the selected type of auxiliary storage comprises a direct access storage device, and wherein the chosen auxiliary storage medium comprises a direct access storage device data set to store the data, the data set being chosen from a plurality of data sets based on at least one of available space and performance.

7. The method of claim 1, wherein the plurality of auxiliary storage media comprise one or more direct access storage device data sets and one or more storage class media.

8. The method of claim 1, wherein the selecting is based on a paging request received by a real storage manager of a processor, and wherein the selecting is performed by an auxiliary storage manager coupled to the real storage manager.

9. The method of claim 1, wherein the multiple different types of auxiliary storage comprise direct access storage devices and storage class memory.

10. The method of claim 1, wherein the data is to be paged-out from memory and written on auxiliary storage.

11. The method of claim 1, wherein based on the determining indicating the data is required to reside on a particular type of auxiliary storage, the data is unable to reside on one or more other types of auxiliary storage.

* * * * *